(12) United States Patent
McEwen et al.

(10) Patent No.: US 6,194,379 B1
(45) Date of Patent: Feb. 27, 2001

(54) ELEMENTAL ENTERAL FORMULA

(75) Inventors: John W. McEwen, Gahanna; Kent L. Cipollo, Westerville; John H. R. Cramblit, Groveport; Frances C. Pendley, Galena; Stephen J. DeMichele, Dublin; Jeffery Kenneth Weis, Columbus, all of OH (US)

(73) Assignee: Abbott Laboratories, Abbott Park, IL (US)

(*) Notice: Subject to any disclaimer, the term of this patent is extended or adjusted under 35 U.S.C. 154(b) by 0 days.

(21) Appl. No.: 09/071,639

(22) Filed: May 1, 1998

(51) Int. Cl.$^7$ ............... A61K 38/00; A23J 1/00; A23G 3/00
(52) U.S. Cl. ............... 514/2; 514/21; 514/23; 426/72; 426/648; 426/656; 426/657; 426/658; 426/654; 424/195.1
(58) Field of Search .................. 514/2, 21, 23; 426/72, 648, 654, 656, 657, 658; 424/195.1

(56) References Cited

U.S. PATENT DOCUMENTS

| | | |
|---|---|---|
| 4,100,024 | 7/1978 | Alder-Nissen . |
| 4,414,238 * | 11/1983 | Schmidl ............... 426/602 |
| 4,670,268 | 6/1987 | Mahmoud . |
| 4,752,618 | 6/1988 | Mascioli et al. . |
| 4,871,768 | 10/1989 | Bistrian et al. . |
| 4,897,384 | 1/1990 | Janoff et al. . |
| 4,913,986 | 4/1990 | Harvey . |
| 4,963,380 | 10/1990 | Schroeder et al. . |
| 5,059,591 | 10/1991 | Janoff et al. . |
| 5,084,294 | 1/1992 | Schroeder et al. . |
| 5,085,883 | 2/1992 | Garleb et al. . |
| 5,196,198 | 3/1993 | Shaw et al. . |
| 5,221,668 | 6/1993 | Henningfield et al. . |
| 5,223,263 | 6/1993 | Hostetler et al. . |
| 5,223,285 | 6/1993 | DeMichele et al. . |
| 5,231,085 * | 7/1993 | Alexander et al. ............... 514/44 |
| 5,260,336 | 11/1993 | Forse et al. . |
| 5,308,832 | 5/1994 | Garleb et al. . |
| 5,403,826 | 4/1995 | Cope et al. . |
| 5,444,054 | 8/1995 | Garleb et al. . |
| 5,514,655 | 5/1996 | DeWille et al. . |
| 5,547,927 | 8/1996 | Cope et al. . |
| 5,550,106 * | 8/1996 | Petschow et al. ............... 514/2 |
| 5,550,146 | 8/1996 | Acosta et al. . |
| 5,661,180 | 8/1997 | DeMichele et al. . |
| 5,695,803 | 12/1997 | Sharp et al. . |
| 5,723,446 | 3/1998 | Gray et al. . |
| 5,728,678 | 3/1998 | Trimbo et al. . |
| 5,776,887 * | 7/1998 | Wibert et al. ............... 514/2 |

FOREIGN PATENT DOCUMENTS

| | | |
|---|---|---|
| 0 296 119 A2 | 12/1988 | (EP) . |
| 0 421 309 | 4/1991 | (EP) . |
| 0 626 175 | 11/1994 | (EP) . |
| 0 626 177 | 11/1994 | (EP) . |
| 7-255398 | 10/1995 | (JP) . |

OTHER PUBLICATIONS

Patent Abstracts of Japan, vol. 096, No. 002, Feb. 29, 1996.

Kenler, et al., "Early Enteral Feeding in Postsurgical Cancer Patients," Annals of Surgery, 1996, vol. 223, No. 3, pp. 316–333.

Swails, et al., "Effect of a Fish Oil Structured Lipid–Based Diet on Prostaglandin Release From Mononucear Cells in Cancer Patients After Surgery," jJournal of Parental and Enteral Nutrition, 1997, vol. 21, No. 5, pp. 266–274.

Haumann, "Structured Lipids Allow Fat," Inform, Oct., 1997, vol. 8, No. 10, pp. 1004–1011.

"Perative™ Specialized Liquid Nutrition for Metabolically Stressed Patients," Ross Laboratories Product Brochure, May 1992.

"Immun–Aid™ Advanced Metabolic Formulation," McGaw Package Insert, 1992.

"Reabilan HN," O'Brien KMI, Product Brochure, 1993.

"Vital® High Nitrogen, Nutritionally Complete, Partially Hydrolyzed Diet," Ross Laboratories Product Brochure, Jan., 1989.

"Criticare HN®," Mead Johnson Product Brochure, Bristol–Myers Squibb Company, Evansville, Indiana, 1992.

"Peptamen® and Petament VHP® Oral Elemental Diets," Clintec Nutrition Company Product Brochure, 1994.

"Crucial® Complete Elemental Diet for Critically Ill Patients," Clintec Nutrition Company Product Brochure, 1994.

"Vivonex® Plus," Novartis Nutrition Corporation Product Brochure.

* cited by examiner

*Primary Examiner*—Christopher Tate
(74) *Attorney, Agent, or Firm*—J. Michael Dixon

(57) ABSTRACT

The present invention is directed to an elemental liquid nutritional product useful for providing nutrition to a patient having a malabsorption condition by enterally feeding to the patient a nutritionally effective amount of the liquid nutritional products of the present invention. One nutritional product of the present invention includes a protein system in which at least 65 w/w % of said proteins have a molecular weight of less than 5,000 daltons. The proteins system includes soy protein hydrolysate, and partially hydrolyzed caseinate. The preferred products further include a structured lipid formed from marine oil and medium chain triglyceride oil. Palatability of elemental nutritional products has been improved by keeping caloric density in a range from 0.60 kcal/ml to about 1.05 kcal/ml and incorporating sufficient amounts of selected palatability enhancers.

21 Claims, No Drawings

ELEMENTAL ENTERAL FORMULA

TECHNICAL FIELD

The present invention relates generally to an elemental nutritional product useful for providing nutritional support to patients suffering from malabsorption conditions.

BACKGROUND OF THE INVENTION

Although nutrients may be provided by either parenteral or enteral routes, clinicians are making greater efforts to use the enteral route in light of research showing that enteral feeding confers certain physiologic benefits not seen with parenteral feeding. Published studies have reported that early enteral feeding provides energy and nutrients essential for optimal healing and immunocompetence, helps maintain the gut mucosal integrity, and may blunt catabolic effects and normalize blood glucose levels.

For optimal recovery, traumatized patients require proper nutritional intake. Proper nutritional intake is particularly critical for patients suffering from malabsorption conditions such as, for example, Crohn's Disease, short bowel syndrome, pancreatitis and other diseases and illnesses which cause malabsorption of essential nutrients. Lack of proper nutrition can result in malnutrition-associated complications, including prolonged negative nitrogen balance, depletion of somatic and visceral protein levels, immune incompetence, increased risk of infection, and other complications associated with morbidity and mortality. A primary objective of nutritional support for the traumatized person is to replace or maintain the body's normal level of nutrients by providing adequate energy substrates, protein, and other nutrients essential for tissue repair and recovery.

Appropriate enteral nutrition following injury may minimize malnutrition, provide nutrients to the immune system and maintain the gut epithelium, which acts as a barrier to translocation of bacteria. This may help prevent the development of sepsis. Malnutrition may compromise the immune system and contribute to septic complications. It has been reported that cell-mediated immunity is reduced in proportion to the level of malnutrition of the critically ill patient.

Persons suffering from malabsorption conditions are deprived of essential bodily fuels or their precursors thus compromising their nutritional status and more specifically, the integrity of the intestinal tract, especially during times of stress. Often, such patients are intolerant of dietary fiber. Patients suffering from malabsorption syndromes often have a diminished capacity to absorb water and electrolytes. This further challenges the nutritional status of the patient and may lead to dehydration.

To aid persons suffering from malabsorption conditions, enteral diets are desirably provided in an "elemental" state. Strictly speaking, an elemental diet would be one in which all components of the formulation are present in their simplest molecular state. For example, the protein source would be provided as amino acids. The carbohydrate source would be simple sugars. However, such compositions are difficult to formulate and are sometimes not well tolerated by the patient.

One difficulty in preparing products containing high levels of free amino acids is that such products will not form stable emulsions suitable for long term storage. Thus such products are only available in a powdered form requiring reconstitution prior to usage. Health care providers and ambulatory patients typically prefer products that are provided as a liquid and require no reconstitution. A further disadvantage of powdered products is that the high concentration of free amino acids are noted for their extremely objectionable taste. Unfortunately this objectionable flavor can lead to noncompliance with the feeding regimen in patients who would benefit from elemental diets. Examples of such patients include those suffering ulcerative colitis, Crohn's disease, short bowel syndrome, and pancreatitis. Noncompliance with a proper feeding regimen will eventually lead to malnutrition in these patients.

Examples of powdered elemental nutritional products, whose protein source is predominantly amino acids, are Vivonex TEN™, and Vivonex Plus™, and Stresstein™, all of which are manufactured by Novartis.

Further developmental efforts with elemental diets focused on preparing products that would form stable liquid emulsions so that the products could be sold as ready to feed liquid nutritionals, which are typically preferred by health care providers and patients. One way to formulate an "elemental" nutritional product that is stable for extended periods as a liquid, has been to utilize a protein system for the product which incorporates a hydrolyzed protein. Hydrolyzed proteins are desirable because they provide the nutritive equivalent of the original protein in the form of its constituent amino acids and peptides of varying lengths. One useful hydrolyzed protein has been found to be soy protein hydrolysate. However, nutritional products incorporating high concentrations of hydrolyzed soy protein do not yield stable products in the absence of an intact protein. Once a soy protein is hydrolyzed, it loses its primary and secondary structure and consequently some of its functionality, including emulsifying properties. For that reason, it does not have surfactant properties and is unable to stabilize a formulation which results in phase separation.

For example, U.S. Pat. No. 5,403,826 to Cope, et al., discloses a nutritional product for persons infected with HIV. This product includes a soy protein hydrolysate and a second source of protein which comprises a source of intact protein, in a quantity sufficient to yield a stable emulsification of the soy protein hydrolysate and the intact protein. This product does not yield a shelf stable product in the absence of the intact protein. Typically, the intact protein will be present in an amount from about 10% to about 30%. The product also includes a source of fat which is formed from a blend of canola oil, medium chain triglyceride (MCT) oil and fish oil. The '826 patent does not teach the desirability of incorporating a structured lipid into an elemental diet.

As another example, U.S. Pat. No. 5,514,655 to DeWille, et al., teaches an enteral nutritional product with a protein system containing soy protein hydrolysate and intact protein. Approximately, 50% to 90% of the protein system consists of soy protein hydrolysate and the remainder includes not more than 50% of one or more intact protein sources, such as sodium caseinate and whey protein concentrate. The system also includes an emulsifier selected from the group consisting of diacetyl tartaric acid esters of monodiglycerides and sodium stearoyl lactylate.

As still another example, U.S. Pat. No. 5,547,927 to Cope, et al., describes an enteral nutritional product for patients undergoing radiation therapy and/or chemotherapy. This product includes a protein system comprising, in a preferred embodiment, about 60% of a soy protein hydrolysate; about 30% of a whey protein concentrate; and about 10% of a pea protein isolate. This product also does not yield a shelf stable product, in the absence of the intact protein. Because the soy protein hydrolysate does not form a stable emulsion, an emulsifier is added. This product also includes a lipid system comprising MCT oil and canola oil.

One enteral nutritional product containing a protein system comprising a large percentage of hydrolyzed protein is described in U.S. Pat. No. 5,221,668 to Henningfield, et al. This patent discloses a nutritional product for trauma and surgery patients. The product comprises from about 18% to about 24% protein; from about 20% to about 30% lipids; and from about 46% to about 62% carbohydrates. The protein system includes from about 20% to about 35% lactalbumin hydrolysate, from about 60% to about 70% hydrolyzed sodium caseinate, and from about 8% to about 14% L-arginine. It does not include hydrolyzed soy protein.

Another liquid ready to feed product considered to be an elemental formula is currently available from Clintec Nutrition by the trade name Crucial™. Its peptide system includes hydrolyzed casein, but it does not include soy protein hydrolysate. The lipid system includes marine oil, but the marine oil is not incorporated into a structured lipid. The carbohydrate system does not include sucrose.

Peptamen VHP™ is another nutritional product available from Clintec Nutrition that is considered to be an elemental product. The protein system is hydrolyzed whey, the lipid system does not include a structured lipid and the carbohydrate system does not include sucrose.

It has also been found to be beneficial to include a structured lipid as part of an enteral diet. Structured lipids have not yet been incorporated into elemental diets. Structured lipids are triacylglycerols containing mixtures of short-, medium-, and long-chain fatty acids attached to a glycerol backbone for specific functionality. Structured lipids are formed by (a) hydrolysis and esterification, (b) interesterification, (c) lipase-interesterification, (d) traditional chemical methods or (e) genetic manipulation. They are particularly useful because of the way in which they are metabolized. Specific fatty acids can be attached to specific portions of the glycerol backbone to ensure that those fatty acids are absorbed at specific portions of the digestive process.

For example, Norvartis Nutrition of Minneapolis, Minn. manufactures a nutritional product, named IMPACT®, which includes structured lipids. IMPACT® contains randomized structured lipids formed by interesterification of palm kernel oil and sunflower oil. IMPACT® also contains fish oil, present as part of a physical blend. IMPACT® does not contain any fish oil that is part of a structured lipid. It is used for post surgical patients and sepsis patients. IMPACT® does not contain hydrolyzed proteins and would not be considered an elemental nutritional.

As another example, U.S. Pat. No. 5,661,180 to DeMichele, et al., describes a structured lipid which provides substantial benefits in terms of modifying the prostanoid synthesis pathway, resulting in an improved response to endotoxic shock and other stress states. This structured lipid includes three components formed on a glycerol backbone. The first component is either alpha-linoleic acid or dihomogamma-linoleic acid. The second component is a medium chain ($C_6$–$C_{12}$) fatty acid residue and the third component is a $C_{18}$–$C_{22}$ fatty acid residue.

A problem associated with elemental diets is their palatability. A hydrolyzed protein system typically provides an extremely bitter taste. Traditionally, most elemental products are tube fed and thus in these environments the unpalatable taste is not an issue.

However a large unmet need exists in the medical community for an elemental diet that can be consumed conventionally by drinking the formula. As noted above, recent evidence has shown that feeding by the enteral route provides a number of benefits to the patient. Dietitians have given patients with malabsorption syndromes elemental nutritional products and requested that the patient drink the elemental product. The volume the patient is being requested to consume is typically quite large. It can range from at least 250 ml up to 1500 ml, if the patient is relying upon the nutritional beverage as their sole source of nutrition. Despite the benefits that such a feeding regimen would provide, the vast majority of patients are unable to drink sufficient quantities of these elemental products to maintain their nutritional status. The unpalatability of these elemental diets invariably leads to substantial noncompliance issues. The noncompliance invariably leads to malnourished states or exacerbation of their underlying disease states if they attempt to resume a normal diet too early. Any attempt to additionally incorporate marine oil into an elemental diet will further exacerbate palatability issues.

U.S. Pat. No. 4,963,380 to Schroeder, et al., is directed to stabilizing fish oil against degradation. The reference specifies that fructose can be used for such a purpose. At column 4, lines 60–65 it specifies that sucrose was not such a stabilizer.

European Patent Application 0 296 116 discloses a suspension containing marine oils. The palatability of marine oils is increased by utilizing a three component system designed to increase the palatabilty of the marine oil. It includes an inorganic complexing agent, a sensory masking agent, and a sweetening agent. Sweetening agents include amino acid sweeteners, dipeptide sweeteners, etc. Sensory masking agents are flavored oils. Texturizing agents can optionally be included and preferably are not sweet. They are included to improve mouth feel. Crystalline sucrose is one possible texturizing agent. Sucrose is not identified as improving the flavor of fish oil products.

Thus, a need has developed in the art for an elemental nutritional product having improved palatability. Particularly, a need has developed in the art for a liquid nutritional product which incorporates soy protein hydrolysate in conjunction with hydrolyzed caseinate to provide essential nutrients in an easy to digest form. A further need has developed in the art for elemental liquid nutritional products which incorporate structured lipids to provide targeted delivery of essential fatty acids. Further a need has developed in the art to develop elemental nutritionals having improved flavor so that the product may be orally consumed (dranken) rather than tube fed to patients with malabsorption syndromes.

SUMMARY OF THE INVENTION

The present invention is directed to a new elemental nutritional product that solves a number of problems associated with the prior art elemental formulas. The nutritional product of this invention utilizes a totally hydrolyzed protein system that includes soy protein hydrolysate. The protein system comprises hydrolyzed soy proteins in combination with hydrolyzed casein. The use of a totally hydrolyzed protein system makes it easier for the patient to digest the proteins in the product, thereby obtaining the amino acids required for proper nutrition.

This elemental nutritional product also incorporates a structured lipid formed from marine oil and medium chain triglyceride oil. The marine oil provides a source of n-3 fatty acids which alter eicosanoid and cytokine production, yielding an improved immunocompetence and reduced inflammatory response to injury. The inventors further believe that incorporating both marine oil and a medium chain triglyceride into a structured lipid will reduce gastrointestinal complications and infections in patients who have had GI surgery when compared with a group receiving both medium chain triglycerides and marine oil from a physical oil blend.

This elemental formula also solves a serious problem associated with prior art nutritional formula's containing marine oil and extensively hydrolyzed protein systems. Marine oil enhances the immune system of the patient and thus is very desirable in a nutritional product. However, marine oil can produce a nutritional formula having an extremely objectionable taste to a large number of patients. Hydrolyzed proteins also are known to create a product with an extremely objectionable and bitter taste. The lack of palatability leads to noncompliance in ambulatory patients and ultimately to sub-optimal nutritional status in the patient.

DETAILED DESCRIPTION OF THE INVENTION

As used in this application:
a) the term "nutritional product", "nutritional formula", and "product" are being used interchangeably.
b) the term "elemental" refers to an enteral nutritional product in at which at least 65 w/w % of the proteins in the product have a molecular weight of less than 5,000 daltons.
c) any reference to "molecular weight distribution" or to "molecular weight" for a hydrolyzed protein refers to an analysis based upon size-exclusion chromatography (SEC) on a modular HPLC instrument. More specifically, this analytical method includes the following essential features: i) 6M guanidine hydrochloride as the mobile phase, ii) detection by UV absorption at 280 nm wavelength, iii) the column employs a silica-based packing with a diol bonded-phase and 125 angstrom pore-size ("Bio-Rad Bio-Sil SEC-125" or the equivalent "TosoHaas TSK G2000SW"), iv) calibration is achieved using a third-order regression, and v) the molecular-weight standards employed for calibration are phosphorylase B, glyceraldehyde-3-phosphate dehydrogenase, ribonuclease A, insulin, uracil, and the octa-peptide "trp-ala-gly-gly-asp-ser-gly-glu".
d) any reference in this patent application to the RDI for vitamins should be construed as referring to the list published in the 1993 Federal Register, Vol. 58. Further since this list is updated periodically as understanding of human nutrition improves, this invention should be construed as encompassing such future changes as well.
e) any reference in this application to "intact caseinate" refers to a caseinate protein in which the fraction of the protein having a molecular weight greater than 10,000 daltons, but less than 25,000 daltons; is no greater than 24 w/w % based upon the total weight of the caseinate present in the system.
f) any reference to "partially hydrolyzed caseinate" refers to a caseinate protein in which: a) the fraction of the protein having a molecular weight greater than 10,000 daltons but less than 25,000 daltons; is at least 26 w/w % and is no greater than about 55 w/w % of the total amount of caseinate present in the system and, b) the fraction of the caseinate having a molecular weight of less than 14,000 daltons is less than about 20 w/w % of the total caseinate. More preferably, a) the fraction of the protein having a molecular weight greater than 10,000 daltons but less than 25,000 daltons; is at least 26 w/w % and is no greater than about 48 w/w % of the total amount of caseinate present in the system and b) the fraction of the caseinate having a molecular weight of less than 14,000 daltons is less than about 15 w/w %. Most preferably, a) the fraction of the protein having a molecular weight greater than 10,000 daltons but less than 25,000 daltons; is at least 26 w/w % and is no greater than about 39 w/w % of the total amount of caseinate present in the system and b) the fraction of the caseinate having a molecular weight less than 14,000 daltons is less than about 10 w/w %.
g) any reference to an "ambulatory patient" refers to one who is not receiving the nutritional formula via tube feeding. This patient is drinking the product as either a nutritional supplement or as a sole source of nutrition. This patient may be located in a hospital, a long term care facility or at home.
h) any reference to the term "about" should be construed as referring any number in the specified range. For example, a range of 1–10 also encompasses a range of 2–9, 3–6, 7–9, etc.
i) the term "fish oil" and "marine oil" are being used interchangeably.
j) the term "malabsorption condition" refers to ulcerative colitis, Crohn's disease, pancreatitis, and short bowel syndrome as well as to conditions arising as a result of surgery or injury which causes malabsorption of essential nutrients.
k) the term "total calories" refers to the total caloric content of a definitive volume of the finished nutritional product.

As noted above, the present invention is directed to a liquid nutritional product. The product is designed to be used in clinical settings where elemental nutritional products are typically utilized. This product also has a significant advantage over prior art elemental formulas, which allows its use to be expanded to include patients who have not previously received elemental formulas. One such group includes ambulatory patients who are suffering from malabsorption syndromes of the gut. This includes patients suffering from ulcerative colitis, Crohn's disease, and other malabsorption conditions, etc. Such patients were not typically given elemental products due to the highly objectionable taste which often lead to high rates of noncompliance in patients and ultimately malnutrition. Due to the objectionable taste, these patients could not drink sufficient quantities of the elemental product to allow for ingestion of the proper amounts of required nutrients. It is believed that the enhanced palatability of the nutritional products of this invention will not lead to such noncompliance issues.

The nutritional formulas of this invention are designed to be used as sole source nutrition or as a supplement in ambulatory patients. Since the product can be used as a sole source of nutrition it will contain a protein source, a lipid source, a carbohydrate source, vitamins, and minerals in amounts sufficient to maintain a patient's health (i.e., to prevent malnutrition). Such amounts are well known by those skilled in the art and can be readily calculated when preparing such products.

Although not intended to limit the invention in any manner, but to merely serve as a general guideline, the nutritional formulas of this invention will typically provide the following caloric distribution. The protein system will typically provide from about 10% to about 25% of total calories, more preferably from about 18% to about 25% of total calories and most preferably about 20.5% of total calories. The lipid system will provide from about 20% to about 35% of total calories, more preferably about 20% to about 30% of total calories, and most preferably about 25% of total calories. The carbohydrate system will typically provide from about 50% to about 70% of total calories, more preferably from about 50% to about 60% of total calories and most preferably about 54.5% of total calories.

One required component of the nutritional formula of this invention is a protein system. The protein system of the nutritional products of the present invention balances three factors: providing a protein system in which at least about 65% of the proteins have a molecular weight of less than 5,000 Daltons; having an acceptable organoleptic quality; and possessing sufficient emulsifying capability to provide acceptable appearance and physical stability. By being hydrolyzed, the protein system of the present invention is easy to digest, especially for patients with malabsorption syndromes. The protein system of this product will typically comprise soy protein hydrolysate (SPH), partially hydrolyzed caseinate, and optionally the amino acid, arginine. The specific amount of protein or amino acid incorporated can vary widely. However, as a general guideline, the SPH will typically comprise from about 40–90 w/w % of said protein system, more preferably from about 50–70 w/w % and most preferably from about 65–70 w/w % of said protein system. The partially hydrolyzed caseinate will typically comprise from about 10–60 w/w % of said protein system, more preferably about 30–50 w/w % of said system and most preferably about 25–30 w/w % of said system. The amino acid, arginine, optionally may be present in an amount ranging from about 0 to about 10 w/w % of said protein system, more preferably from about 3–10 w/w % of said system, and most preferably from about 5–10 w/w % of said system. Most desirably, the protein system comprises about 67% of the soy protein hydrolysate, about 28% of partially hydrolyzed sodium caseinate and about 5% L-arginine (all by weight).

One of the constituents of the protein system of this invention is soy protein hydrolysate. Soy protein hydrolysate is well known in the field of nutrition. It has previously been used in elemental nutritional products. For example, please refer to U.S. Pat. No. 5,514,655, U.S. Pat. No. 5,547,927, or U.S. Pat. No. 5,403,826; all of which are hereby incorporated by reference.

Methods for making soy protein hydrolysate are well known to those skilled in the art. For example, the properties of a useful SPH and the method for making such a SPH are disclosed in U.S. Pat. No. 4,100,024, which is hereby incorporated by reference in its entirety. Briefly, the process for the preparation of polypeptides from soy protein involves: hydrolyzing soy protein with a microbial, alkaline proteinase in a concentration ranging from 4 to 25 Anson units per kilogram of soy protein, at a substrate concentration of between 5% and 20% w/w soy protein, at a pH in the range from 7.5 to 8.5, until a degree of hydrolysis in the range of from about 8% to about 15% is attained, where after the enzyme is inactivated by a reduction of pH with a food grade acid, then recovering the supernatant from the precipitate. However, it is understood that a SPH produced by any other process which has the characteristics elaborated upon herein may be used in the practice of the present invention. SPH useful with this invention is available from MD Foods of Denmark.

The soy protein hydrolysate utilized in the nutritional products of this invention should be extensively hydrolyzed. At least 50 w/w % of the soy protein hydrolysate should have a molecular weight of less than 1,000 daltons. Further at least about 80–90 w/w % of the soy protein hydrolysate should have a molecular weight of less than 5,000 daltons. More preferably at least about 85–90 w/w % of the soy protein hydrolysate has a molecular weight of less than 5,000 daltons and most preferably at least about 95 w/w % of the soy protein hydrolysate has a molecular weight of less than 5,000 daltons. The use of a protein hydrolysate having a low molecular weight means that the hydrolysate is composed of a large number of small peptides. These peptides are easier for the patient to digest than a product which contains large partially hydrolyzed proteins. Such a distribution has the disadvantage of increasing the difficulty of preparing a liquid product that will form stable emulsions for an extended period of time. Attempts to produced a stable emulsion containing exclusively SPH have been unsuccessful.

The second required component of the protein system is partially hydrolyzed caseinate, such as sodium caseinate or calcium caseinate (more preferably sodium caseinate), which contributes to a well balanced protein system by providing additional amino acids for the patient. Unexpectedly, the caseinate also serves as an emulsifier despite being partially hydrolyzed. Previous work with soy protein hydrolysate has specified that there must be an intact protein in the product, in order to be able to form a stable emulsion having a shelf life of at least 12 months. For example, see U.S. Pat. Nos. 5,514,655 or 5,403,826.

However the inventors have discovered how to form stable emulsions with soy protein hydrolysate and a second hydrolyzed protein. The inventors have discovered that partially hydrolyzed caseinate will stabilize soy protein hydrolysate. The inventors have discovered that it is necessary to control: a) the fraction of the caseinate having a molecular weight distribution between 10,000 and 25,000 daltons and b) the fraction of the caseinate having a molecular weight distribution of less than 14,000 daltons. The inventors have discovered that hydrolyzed caseinate will serves as an emulsifier provided that: a) no more than about 55 w/w % of said caseinate has a molecular weight greater than 10,000 daltons but less than 25,000 daltons, and; b) less than about 20 w/w % of the caseinate has a molecular weight of less 14,000 daltons. Thus it has been discovered that partially hydrolyzed caseinate will emulsify soy protein hydrolysate provided the fraction of the caseinate having a molecular weight distribution between 10,000 daltons and 25,000 daltons is maintained at a range between 26 w/w % and about 55 w/w % of the total caseinate present in the system, more preferably between 26 w/w % and about 48 w/w %, and most preferably between 26 w/w % and about 39 w/w %. Additionally it is also necessary to control the fraction of the caseinate having a molecular weight distribution of less than 14,000 daltons. Less than about 20 w/w % of the total caseinate present in the system should have a molecular weight of less than 14,000 daltons, more preferably less than about w/w % should have a molecular weight of less than 14,000 daltons and most preferably less than about 10 w/w % of the total caseinate present should have a molecular weight of less than 14,000 daltons. The hydrolysis of the caseinate will further serve to facilitate the digestion of the protein system by the patient who is in need of an elemental diet. The inventors have further discovered that it is not necessary to control the molecular weight distribution for other fractions appearing in the caseinate.

Hydrolyzed caseinate meeting the molecular weight distribution described above is known in the art and is available commercial. Preferably, the caseinate will be a partially hydrolyzed sodium caseinate, such as "Alanate 167" or "Alanate 166," both of which are available from New Zealand Milk Products of Santa Rosa, Calif.

The protein system of the nutritional products of the present invention preferably includes L-arginine which provides a source of free amino acids. Desirably, the arginine will comprise about 1% of the total calories of the nutritional products. Arginine has several physiologic effects. The feeding of arginine has been shown to accelerate wound healing and nitrogen retention after injury. The effects on wound healing may be due to increased synthesis of collagen in wounds. Published reports have indicated that rats fed diets supplemented with both arginine (24%) and glycine (1%) deposited more hydroxyproline, a component of collagen, in wounds that are healing when compared to animals fed control diets. Published studies have examined the effects of dietary arginine on cells of the immune system, such as T-lymphocytes and natural killer cells. For example, please refer to Daly et al: Immune and metabolic effects of arginine in the surgical patient, Ann Surg 1988; 208:512–523 or Reynolds et al: Immunomodulatory mechanisms of arginine, Surgery 1988; 104:142–151. Supplemental arginine may enhance immune function through increases in thymic weight and enhances thymocyte and peripheral blood lymphocyte response to nitrogen. Similarly, published reports have indicated that healthy individuals whose diets were increased with arginine (25 g/day) exhibited increased T-lymphocyte activation compared with a group fed glycine. Another published study found that dietary L-arginine was important for lymphokine-activated killer cell activity. Other published studies have reported that diets providing 6% of the total calories as arginine HCl were associated with an increased mortality in animal models of sepsis.

The second embodiment or component of the nutritional products of this invention is the lipid system. As stated above, from about 20% to about 35% of the total calories of the nutritional products of the present invention are provided by this lipid system. The primary component of the lipid system is a structured lipid, or synthetic triglyceride, comprising marine oil and medium chain triglyceride oil. The lipid system will also typically include a blend of oils selected to provide all essential fatty acids to a patient.

Structured lipids are known in the art. A concise description of structured lipids can be found in INFORM, Vol. 8, no. 10, page 1004, entitled Structured lipids allow fat tailoring (October 1997). Also see U.S. Pat. No. 4,871,768 which is hereby incorporated by reference. Structured lipids are predominantly triacylglycerols containing mixtures of medium and long chain fatty acids on the same glycerol nucleus. A minor amount of diacylglycerols typically are produced and should be considered to be encompassed by the invention. Naturally occurring triacylglycerol molecules do not contain medium and long chain fatty acids on the same molecule. They will contain exclusively medium chain fatty acids or long chain fatty acids (though typically not the same medium chain or long chain fatty acid). Thus the term "structured lipid" has been coined to refer to these synthetic derivatives that contain a mixture of long chain and medium chain fatty acids on the same glycerol nucleus (please see U.S. patent application Ser. No. 08/991,503 for a more detailed description which is hereby incorporated by reference).

Processes for manufacturing structured lipids useful with the product of the present invention are disclosed in U.S. Pat. Nos. 4,871,768 and 5,260,336, the disclosures of which are hereby incorporated by reference. A structured lipid useful in the present invention can be made using standard procedures. The most common procedure uses sodium methylate as a catalyst for an interesterification reaction, forming the structured lipid. Because water "poisons" the sodium methylate catalyst, it is first necessary to dry the fats and/or oils used in the process. This is normally carried out by heating the fats to a temperature of 120° C. to 150° C. while under vacuum. Once the fats are dry (having a water content of less than 0.001%), the fats are cooled to the reaction temperature of 60° C. to 80° C. Sodium methylate powder, approximately 0.2 to 0.4% by weight based on fat content, is added to the dried fat and agitated for 30 to 60 minutes. A small amount of soda ash may be added at this time to neutralize free fatty acid. Once the reaction is completed, the catalyst is neutralized using $CO_2$ or phosphoric acid prior to water washing, refining and drying. Such structured lipids are also commercially available.

One of the lipids incorporated into the structured lipid is a marine oil. Marine oils include herring oil, cod oil, anchovy oil, tuna oil, sardine oil, and menhaden oil, etc. These oils are rich in n-3 polyunsaturated fatty acids (PUFAs), especially eicosapentaenoic acid (EPA) and docosahexaenoic acid (DHA). PUFAs have significant effects on eocosanoid and cytokine production. Specifically, n-3 PUFAs favor production of prostaglandins of the 3 series ($PGE_3$) and leukotrienes of the 5-series, as well as reduction of 2 series prostaglandins($PGE_2$) and 4 series leukotrienes. These changes in eicosanoid synthesis seen with n-3 PUFA feeding are associated with an improved immunocompetence and a reduced inflammatory response to injury. Patients in need of elemental diets typically will benefit from having their immunocompetence improved.

The second component of the structured lipid is the medium chain triglyceride oil. Sources of medium chain triglyceride oil include coconut oil and palm kernel oil. These oils are high in saturated fatty acids in the $C_8$–$C_{12}$ range, especially caprylic (C:8.0) and capric (C:10.0).

The fish oil/medium chain structured lipid of this invention will be an admixture of differing triacyl glycerols. Typically the admixture of structured lipids will exhibit the following distribution. From about 30 w/w % to about 70 w/w % of the structured lipid will be medium chain triglyceride oil and from about 70 w/w % to about 30 w/w % of the structured lipid will be marine oil. More preferably the marine oil will comprise from about 50–60 w/w % of the structured lipid and the medium chain triglyceride oil will comprise from about 40–50 w/w % of the structured lipid. Most preferably it will be about 53–54 w/w % marine oil and about 46–47 w/w % medium chain triglyceride oil. Most preferably the marine oil will be sardine oil.

In addition to providing benefits to the immune system, the structured lipid increases the absorption and transport of essential dietary fatty acids by putting both the marine oil and the medium chain triglyceride oil on the same glycerol backbone. Particularly, the structured lipid increases the absorption of eicosapentaenoic acid (EPA, C20:5n-3) and docosahexaenoic acid (DHA, C22:6n-3). The inclusion of medium and long chain fatty acids on the same glycerol backbone is thought to increase the water solubility of the fatty acids, increase the body's ability to digest the fatty acids, and increase the concentration of fat in the chylomichrons. Thus, the structured lipid aids in absorption, delivery and transport of essential fatty acids.

In addition to the structured lipid, the lipid system will also typically contain a blend of oils designed to provide all of the essential fatty acids required to prevent malnutrition. These essential fatty acids include linoleic acid and alpha-linolenic acid. These essential fatty acids can be provided by incorporating canola oil and soy bean oil into the formula. Other sources of these essential fatty acids are well known in the art and include borage, black currant seed, corn, marine oils, fungal oils, safflower, high oleic safflower, sunflower, high oleic sunflower, evening primrose, cottonseed, rice bran, grapeseed, flaxseed, garlic, peanuts, almonds, walnuts, wheat germ, egg, and sesame.

As noted above, the lipid system of this invention will typically provide from about 20% to about 35% of total calories. The structured lipid will typically be the predominant source of lipid in the lipid system. The amount incorporated into the system can range widely and will typically comprise from about 30 w/w % to about 75 w/w % of the lipid system. More preferably the structured lipid will be present in the lipid system in an amount ranging from about 50 w/w % to about 65 w/w % of the system and most preferably will be present at about 60 w/w %.

The amount of the non-structured lipid (source of essential fatty acids and energy) incorporated into the lipid system can vary widely. However these non-structured lipids will typically be present in an amount ranging from about 25 w/w % to about 70 w/w % of the lipid system. More preferably these non-structured lipids will comprise from about 35 w/w % to about 50 w/w % of the lipid system. Most preferably it will comprise about 40 w/w % of the lipid system.

The lipid system of the present invention desirably comprises a blend of marine oil and medium chain triglyceride oil provided in the form of a structured lipid in combination with a blend of canola oil, soybean oil and an emulsifier. More desirably, the lipid system will comprise about 32% marine oil, about 28% MCT oil, about 18% canola oil, about 18% soybean oil and about 4% emulsifier, with the marine oil and the MCT oil being provided in the form of a structured lipid.

Marine oils, such as herring oil, cod oil, anchovy oil, tuna oil, sardine oil and menhaden oil, are rich in n-3 fatty acids which reduce prostaglandin production and the expression of certain oncogenes as described above. Desirably, the marine oil will be a refined, deodorized sardine oil. Medium chain triglycerides are a readily absorbed source of energy and are useful for meeting the caloric needs of patients. Canola oil provides alpha-linolenic acid, linoleic acid and oleic acid. It is relatively low in saturated fat. The n-3 fatty acid provided by canola oil may have beneficial effects on the immune system, mediated through changes in the synthesis of prostaglandin as described above. Soybean oil provides an additional source of linoleic acid. Soybean oil also serves as a source of long chain triglycerides which provide fatty acids of 12 to 26 carbons in length. The emulsifier, if present, is provided to maintain the lipid system in an emulsion. Useful emulsifiers include, but are not limited to, diacetyl tartaric acid esters of monodiglycerides. One useful emulsifier is PANODAN® which is distributed by Grinsted of Danisco, Denmark. PANODAN® is diacetyl tartaric acid esters of monodiglycerides and is an anionic surfactant with a very hydrophobic component attached. It is generally regarded as safe (GRAS) for use in nutritional products for human consumption. PANODAN® works by imparting a negative charge to fat globules causing them to electrostatically repel each other so that no flocculation or coalescence occurs. It is also believed that sodium stearoyl lactoylate could be used as an emulsifier but it has not yet been classified as GRAS by the United States Food and Drug Administration.

Lipids provide energy and essential fatty acids and enhance absorption of fat soluble vitamins. The type of lipid consumed affects many physiological parameters such as plasma lipid profile, membrane lipid composition and synthesis of mediators of the immune response such as prostaglandins and thromboxanes. The lipid system of the present invention is designed so that the nutritional products of the present invention can be fed acutely (e.g., for 7 to 14 days to post surgery or trauma patients) or chronically (e.g., for up to 30 days to Crohn's patients) and have the best chance to produce positive clinical outcomes. Desirably, the lipid blend will supply from about 4 grams to about 5 grams of Eicosapentaenoic acid (EPA, C20:5n-3) and Docosahexaenoic acid (DHA, C22:6n-3) per about six eight-ounce servings which is approximately equivalent to 1422 ml.

The lipid system of the present invention further provides a ratio of n-6 fatty acids to n-3 fatty acids from about 0.2:1 to about 2.5:1 and desirably about 0.82:1. By providing such a ratio of n-6 to n-3 fatty acids, the formulation of the present invention can be used to feed patients either as a sole source of nutrients or as a dietary supplement. The level of n-6 fatty acids is not so low that feeding the formulation as the sole source of nutrition would result in the patient suffering from a fatty acid deficiency. Further, the level of n-6 fatty acids is not so high that feeding the formula as a supplement would cause a possible increase in inflammation for the patient by overloading the patient's diet with n-6 fatty acids. To avoid essential fatty acid deficiency issues with chronic feeding applications, the levels of linoleic acid (18:2n6) and alpha-linolenic acid (18:3n3) fatty acids were chosen to deliver about 3.6% and about 0.8%, respectively, of total energy based on a volume of nutritional product of about 1422 ml, with a ratio of Linoleic Acid (18:2n6) to Linolenic Acid (18:3n3) fatty acids of about 4.5. Because the product of the present invention includes elevated amounts of n-3 fatty acids, it is desirable that the product also include adequate amounts of antioxidants to minimize in-product and in-vivo lipid peroxide formation.

The third component or embodiment of the nutritional products of this invention is a source of carbohydrates. Carbohydrates are an important energy source for the patient as they are readily absorbed and utilized. They are the preferred fuel for the brain and red blood cells. The carbohydrates that may be used in the elemental formula can vary widely. Examples of suitable carbohydrates that may be utilized include hydrolyzed corn starch, maltodextrin, glucose polymers, sucrose, corn syrup solids, glucose, fructose, lactose, high fructose corn syrup and fructooligosaccharides.

As noted above, the carbohydrates should provide from about 50% to about 70% of the total calories of formula. Any single carbohydrate listed above, or any combination thereof, as appropriate may be utilized to provide these calories. Alternatively, other carbohydrates not listed above may be utilized provided they are compatible with the nutritional needs of a patient having a malabsorption syndrome.

In a more preferred embodiment of the present invention, the carbohydrate system is designed especially for patients requiring an elemental diet. One such embodiment is the inclusion of a novel ingredient into the carbohydrate system. This novel ingredient is an indigestible oligosaccharide which is commonly referred to as fructooligosaccharide (FOS). While fructooligosaccharides have been utilized in enteral products before, they have not been incorporated into an elemental formula before. It is believed that FOS will be beneficial for patients with malabsorption syndromes. The FOS will promote the development and maintenance of a healthy microbial flora.

FOS is rapidly and extensively fermented to short chain fatty acids by anaerobic microorganisms that inhabit the large bowel. It has been shown that FOS increases cell proliferation in the proximal and distal colonic epithelial mucosa. Further FOS is a preferential energy source for most Bifidobacterium species but it is not utilized by potentially pathogenic organisms such as *Clostridium perfingens, C. difficile*, or *E. coli*. Thus, the addition of FOS to the nutritional products of the present invention selects for beneficial bacteria, such as bifidobacteria, but against potential pathogens, such as *Clostridium difficile* and putrefactive bacteria. Because the maintenance of gut integrity and colonization resistance is important to the positive outcome of stressed patients, the addition of indigestible oligosaccharides, as an indirect source of SCFA, to the nutritional products of the present invention prevents intestinal epithelial atrophy and bacterial translocation. Further, FOS makes the nutritional products of the present invention more tolerable for the patient than prior art nutritional products by maintaining gut integrity and colonization resistance. FOS has not been incorporated into elemental diets to date.

Desirably, fructooligosaccharide will comprise from about 0 w/w % to about 10 w/w % of the carbohydrate system and more preferably about 3 w/w % to about 6 w/w % of the carbohydrate system. Accordingly, from about 0 to about 15 grams of FOS will be incorporated into a liter of the nutritional product, and more preferably about 5 grams/liter as part of the carbohydrate system.

The preferred carbohydrate system has also been designed to improve the palatability of the nutritional formula. More specifically, the carbohydrate system has been designed to improve the palatability of the combination of the hydrolyzed protein system and the marine oil structured lipid.

As noted above, marine oil has numerous beneficial effects on a patients immune system. However, products containing marine oil have a significant drawback. They are noted for their extremely undesirable flavor. This undesirable flavor can lead to patients not consuming the fish oil due to the objectionable taste. As is also described above, the protein system of this nutritional product is extensively hydrolyzed. It incorporates soy protein hydrolysate, hydrolyzed caseinate and a free amino acid, arginine. Such a combination of proteins will be highly beneficial for patients requiring elemental diets. However such a protein system has an extremely bitter flavor that is highly objectionable to most patients. This too can lead to a high rate of noncompliance in ambulatory patients.

One of the populations of patients these products have been designed for is ambulatory patients such as those suffering from Crohn's disease, ulcerative colitis, and other malabsorption conditions. Such a group of patients will not be tube fed, but will drink the product. An unpalatable product is less likely to be orally consumed and patient noncompliance will lead to malnutrition.

It has been unexpectedly discovered that a manipulation of several factors (including the carbohydrate system) can lead to a significantly improved tasting product. One variable is to control caloric density. It has been discovered that maintaining caloric density in a range from about 0.60 kilocalories (kcal) per ml to about 1.10 kilocalories per ml, more preferably from about 0.90 kcal/ml to about 1.05 kcal/ml and most preferably about 1.0 kcal/ml will decrease the bitterness of the product.

A further discovery is that incorporating a palatability enhancer into the carbohydrate system will further improve product flavor. Sucrose is one such palatability enhancer. If sucrose is chosen, sucrose levels should be elevated so that they provide at least about 19% of total calories of the product, more preferably about 19–30%, and most preferably about 21%–22% of total calories. Other palatability enhancers include fructose, glucose (dextrose), and high fructose corn syrup. If fructose is utilized, sufficient fructose should be incorporated into the formula to provide at least 10.5% of total calories, more preferably from 10.5% of total calories to 16.5% of total calories and most preferably about 11.5%–12.5% calories. If dextrose is utilized as a palatability enhancer, then a sufficient amount should be incorporated into the formula to provide at least 25% of total calories, more preferably from 25% of total calories to 39%, and most preferably about 28%–29% of total calories. If high fructose corn syrup is utilized, than a sufficient amount should be incorporated into the nutritional formula to provide at least about 19% of total calories, more preferably from about 19% of total calories up to 30% of total calories and most preferably about 21%–22% of total calories.

The discovery that sweeteners such as sucrose would improve flavor was not as straightforward as might be expected. The product contains fish oil. Sucrose, and other sweeteners typically intensifies the "fishiness" of the flavor. The preferred product of this invention utilizes marine oil to provide at least 20–30 w/w % of the total lipids in the product. There was a high probability that the sucrose would have negatively impacted the overall flavor of the product, rather than having improved it. Further, sucrose has a significant effect on the osmolality of the product. Products with a high osmolality increase the possibility of the product causing diarrhea. A further unexpected discovery was that these high sucrose products could be used in patient populations such as those suffering from Crohn's or ulcerative colitis. The osmolality of these product should be maintained at a level below 700 mosm/kg $H_2O$, more preferably below 600 mosm/kg $H_2O$.

As described above, the amount of the palatability enhancer can vary widely. Typically though the palatability enhancer will make the following contribution to the carbohydrate system, when expressed as w/w % of the total carbohydrate system: a) sucrose, from about 35%45% w/w % and more preferably about 40 w/w %; b) fructose, from about 19% w/w % to about 25 w/w %, and more preferably about 22 w/w %; c) dextrose, from about 46 w/w % to about 59 w/w % and most preferably about 53 w/w %, and; d) high fructose corn syrup, from about 35 w/w % to about 45 w/w % and most preferably about 40 w/w %. The FOS and any other suitable carbohydrate will make up the balance of the carbohydrate system.

The preferred carbohydrate system will comprise from about 45% to about 65% maltodextrin, from about 35% to about 45% sucrose and from about 3% to about 6% FOS. More desirably, the carbohydrate system comprises about 55% maltodextrin, about 40% sucrose and about 5% FOS.

The nutritional products of the present invention may also include additional vitamins and minerals. Desirably, the nutritional products are designed so that six eight-ounce servings, which is approximately about 1422 ml, will provide about 100% of the recommended daily intake of vitamins and minerals (at least 100% of the RDI). As much as about three liters per day of the nutritional products of the present invention can be provided to the patient. Desirably, the products will include all natural vitamin E and beta-carotene, other essential vitamins, trace minerals, ultra trace minerals, carnitine, and taurine. If the nutritional products are formulated to be fed to patients suffering from malabsorption conditions, the products may also include elevated levels of magnesium, calcium, zinc and vitamins D, C, $B_{12}$ and folic acid. Desirably, the products of the present invention contain vitamin C and the B vitamins in amounts greater than the U.S. RDA for an amount of product sufficient to provide about 1500 kcal to insure adequate caloric intake for hypermetabolic patients.

The present invention also desirably includes vitamin A. Evidence exists that vitamin A may reverse some of the immunosuppression which occurs following injury and, therefore, additional vitamin A for trauma patients may be beneficial. Beta carotene does not have the toxicity problems of vitamin A and may be the preferred form to add supplemental retinol equivalents to the diet. Beta carotene itself may enhance immune system function and functions as an antioxidant. Desirably, the nutritional products of the present invention contain both vitamin A and beta carotene.

The nutritional products of the present invention also desirably include vitamin E. Vitamin E also serves as an antioxidant and plays a role in the immune system, and is present in the nutritional products at a level of at least 45 IU per 1,500 kcal. As stated above, beside providing an essential nutrient, antioxidants also prevent peroxide formation in the nutritional products and in vivo. Other useful antioxidants include vitamin C, manganese, copper, zinc, selenium and taurine.

Desirably, the products of the present invention also include both taurine and carnitine. Taurine (alpha-aminoethanesulfonic acid) is involved in a wide variety of metabolic processes, including those of the central nervous system. It is involved in the conjugation of bile acids, helps regulate the aggregation of platelets, and aids in the function of neutrophils. Synthesized via cysteine, taurine is classified as a sulfur-containing amino acid. It is considered nonessential for humans under normal physiologic circumstances, although a decline in serum taurine concentrations suggests that taurine supplementation is needed in the post-injury state.

Carnitine is required metabolically to transfer long-chain fatty acids into the mitochondria for energy production. Carnitine is present in food, including meats and dairy products, and typical mixed diets provide 0.18 to 319 mg of carnitine/day. Published clinical trials have indicated that the excretion of carnitine increases after injury, and carnitine deficiency during antibiotic therapy has been reported. These results indicate that the supply of carnitine may be limited under certain circumstances and, therefore, should be supplied to trauma patients.

The nutritional products of the present invention may also include zinc. The recommended intake of zinc is 15 mg/day for a healthy adult, and inadequate zinc intake by "healthy" people is not uncommon. An inadequate intake of zinc is associated with skin lesions, poor wound healing and immunodeficiency characterized by thymic atrophy. Alterations in zinc metabolism occur after trauma. For example, sepsis is associated with a decreased serum zinc level and an accumulation of zinc within the liver. Desirably, the product of the present invention provides at least 100% of the U.S. RDI of zinc.

In addition to vitamins discussed above, the product will typically contain minerals and electrolytes in amounts sufficient to prevent malnutrition in a patient. These include selenium, chromium, molybdenum, iron, magnesium, potassium, chloride, and calcium. The amounts that should be added can vary widely and are well known to those skilled in the art.

The nutritional products of the present invention may also include one or more stabilizers to improve the appearance of the final product. Useful stabilizers include, but are not limited to, gellan gum and carrageenans. Although carrageenans may be used as a stabilizer, it is recommended that they not be used when the nutritional product is intended for use with persons suffering from malabsorption conditions because carrageenans may be bowel irritants. Typically, the nutritional products of the present invention will include from about 200 ppm to about 400 ppm gellan gum, more preferably from 200 ppm–300 ppm, and most preferably about 250 ppm. The resulting product containing gellan gum will have a viscosity ranging from about 20–100 centipoise (cps), more preferably from about 30–60 cps and most preferably about 40–50 cps.

The nutritional products of the present invention will also desirably include a flavoring to provide the nutritional products with a palatable taste for enteral consumption. Useful flavorings include banana, orange cream, butter pecan, chocolate and vanilla. Desirably, the flavoring will be either banana, vanilla, or chocolate.

The nutritional products of this invention can be manufactured using techniques well known to those skilled in the art. Typically an oil blend is prepared containing all oils (except for the structured lipid), any emulsifier, and the fat soluble vitamins. Two more slurries (carbohydrate and protein) are prepared and mixed together with the oil blend to which a portion of the protein has been added. The structured lipid is metered into the admixture per the teachings of U.S. Pat. No. 5,554,589 which is hereby incorporated by reference. The resulting mixture is homogenized, heat processed, standardized with vitamins and minerals flavored and terminally sterilized.

EXAMPLE 1

Table 1 presents a bill of materials for manufacturing 6,804 kilograms of a vanilla flavored liquid nutritional product according to the present invention. A detailed description of its manufacture follows.

TABLE 1

Bill of Materials
For Vanilla Flavored Product

| Ingredient Name | Amount |
| --- | --- |
| Water | 5207.7 kg |
| Maltodextrin | 529.9 kg |
| Sucrose | 359.2 kg |
| SPH | 273.2 kg |
| Fish Oil/Medium Chain Triglyceride as a Structured Lipid | 109.8 kg |
| Partially Hydrolyzed Sodium Caseinate | 100.3 kg |
| FOS | 39.4 kg |
| Canola Oil | 32.9 kg |
| Soybean Oil | 32.9 kg |
| 45% KOH | 24.9 kg |
| Micronized Tri-Calcium Phosphate | 19.5 kg |
| Arginine | 16.5 kg |
| Sodium Citrate | 15.6 kg |
| Art. Caramel Flavor | 10.2 kg |
| Panodan | 7.3 kg |
| N&A Vanilla Flavor | 6.8 kg |
| Magnesium Phosphate | 6.5 kg |
| Magnesium Chloride | 5.9 kg |
| Potassium Citrate | 5700.0 g |
| Ascorbic Acid | 4740.0 g |
| Choline Chloride | 3225.0 g |
| Gellan Gum | 1701.0 g |
| DEK Premix | 1380.0 g |
| Taurine | 945.0 g |
| Carnitine | 885.0 g |
| Vitamin E (RRR) (81%) | 705.0 g |
| Trace Mineral Premix | 685.5 g |
| WSV Premix | 600.1 g |
| 30% Beta Carotene | 105.4 g |
| Vitamin A (55%) | 34.50 g |
| Potassium Iodide | 1.32 g |

TABLE 1-continued

Bill of Materials
For Vanilla Flavored Product

| Ingredient Name | Amount |
| --- | --- |
| Sodium Selenite | 0.90 g |
| Vitamin K | 0.43 g |

The trace mineral premix includes zinc sulfate (0.314 kgs.), ferrous sulfate (0.266 kgs.), manganous sulfate (0.776 kgs.), copper sulfate (0.264 kgs.). The water soluble vitamin premix includes niacin amide (0.22 kgs.), d-calcium pantothenate (0.145 kgs.), folic acid (0.005 kgs.), thiamine chloride HCl (0.037 kgs.), riboflavin (0.029 kgs.), pyroxidine HCl (0.036 kgs.), cyanocobalamin (0.0001 kgs.) and biotin (0.004 kgs.) in a dextrose carrier. The vitamin DEK premix includes vitamin D3 (0.66g), vitamin E (rrr form) (380.5 g), and vitamin K (0.23 g) in a coconut oil carrier The liquid nutritional products of the present invention have been manufactured by preparing three slurries which are blended together, combined with the marine oil/MCT structured lipid, heat treated, standardized, packaged and sterilized. The process for manufacturing 6804 kilograms of a liquid nutritional product, using the bill of materials from Table 1 is described in detail below.

A carbohydrate/mineral slurry is prepared by first heating about 1040 kilograms of water to a temperature from about 65° C. to about 71° C. with agitation. The following minerals are then added in the order listed, under high agitation: sodium citrate, trace mineral premix, potassium citrate, magnesium chloride, magnesium phosphate, tricalcium phosphate and potassium iodide. Next, the maltodextrin is added to slurry under high agitation, and is allowed to dissolve while the temperature is maintained at about 71° C. The product has been manufactured using maltodextrin distributed by Grain Processing Corporation, Muscataine, Iowa, U.S.A. under the product name "Maltrin M-100." The sugar (sucrose) and fructooligosaccharides are then added under high agitation. The product has been manufactured using fructooligosaccharide powder distributed by Golden Technologies Company, Golden, Colo., U.S.A. under the product designation "Nutriflora-P Fructo-oligosaccharide Powder (96%)." The gellan gum is then dry blended with sucrose in a 1/5 (gellan gum/sucrose ratio), and added to the slurry under high agitation. The product has been manufactured using gellan gum distributed by the Kelco, Division of Merck and Company Incorporated, San Diego, Calif., U.S.A. under the product name "Kelcogel." Sodium selenite that has been dissolved in warm water is then added to the slurry under agitation. The completed carbohydrate/mineral slurry is held with high agitation at a temperature from about 65° C. to about 71° C. for not longer than twelve hours until it is blended with the other slurries.

An oil slurry is prepared by combining and heating the soybean oil and canola oil to a temperature from about 55° C. to about 65° C. with agitation. The emulsifier (diacetyl tartaric acid esters of monodiglycerides) is then added under agitation and allowed to dissolve. The product has been manufactured using diacetyl tartaric acid esters of mono-diglycerides distributed by Grindsted Products incorporated, New Century, Kans., U.S.A. under the product name PAN-ODAN®. The Vitamin DEK premix, 55% Vitamin A Palmitate, D-alpha-tocopherol acetate (R,R,R form), phyl-loquinone and 30% beta-carotene are then added to the slurry with agitation. The completed oil slurry is held under moderate agitation at a temperature from about 55° C. to about 65° C. for a period of no longer than twelve hours until it is blended with the other slurries.

A protein in water slurry is prepared by first heating about 2900 kilograms of water to a temperature from about 60° C. to about 71° C. with agitation. The soy protein hydrolysate is then added to the water under agitation. The product has been manufactured using soy protein hydrolysate distributed by MD Foods, Viby J., Denmark under the trade designation "Soy Protein Hydrolysate." Next, 45% potassium hydroxide is added under agitation to raise the pH to from about 4.3 to about 5.5. The L-arginine is added, and partially hydrolyzed sodium caseinate is blended into the slurry using a mixing apparatus. The product has been manufactured using partially hydrolyzed sodium caseinate distributed by New Zealand Milk Products Incorporated, Santa Rosa, Calif., U.S.A. under the product name "Alanate 167." The completed protein in water slurry is held under moderate agitation at a temperature from about 60° C. to about 71° C. for a period of no longer than two hours until it is blended with the other slurries.

The protein in water and oil slurries are blended together with agitation and the resultant blended slurry is maintained at a temperature from about 55° C. to about 65° C. After waiting for at least one minute, the carbohydrate/mineral slurry is added to the blended slurry from the preceding step with agitation and the resultant blended slurry is maintained at a temperature from about 55° C. to about 65° C. The vessel which contained the carbohydrate/mineral slurry should be rinsed with about 20 15 kilograms of water and the rinse water should be added to the blended slurry. The marine oil/MCT structured lipid is then added to the blended slurry with agitation. Desirably, the marine oil/MCT structured lipid is slowly metered into the product as the blend passes through a conduit at a constant rate.

After waiting for a period of not less than one minute nor greater than two hours, the blend slurry is subjected to deaeration, ultra-high-temperature treatment, and homogenization, as follows:

A. use a positive pump to supply the blended slurry for this procedure;
B. heat the blended slurry to a temperature from about 65° C. to about 71° C.
C. deaerate the blend to 28–38.1 cm hg
D. emulsify the blended slurry at 63–77 atmospheres;
E. pass the mix through a plate/coil heater and heat the mix to from about 120° C. to about 122° C. with a hold time of about 10 seconds;
F. ultra high temperature heat the blended slurry to a temperature of about 144° C. to about 147° C. with a hold time of about 5 seconds;
G. reduce the temperature of the blended slurry to from about 122° C. to about 122° C. by passing it through a flash cooler;
H. reduce the temperature of the blended slurry to from about 71° C. to about 82° C. by passing it through a plate/coil heat exchanger;
I. homogenized the blended slurry at 274–288/28–42 atmospheres;

-continued

J. pass the blended slurry through a hold tube for at least 16 seconds at temperature from about 74° C. to about 88° C.;
K. cool the blended slurry to a temperature from about 1° C. to about 7° C. by passing it through a heat exchanger; and
L. store the blended slurry at a temperature from about 1° C. to about 7° C. with agitation.

Preferably, after the above steps have been completed, appropriate analytical testing for quality control is conducted. Based on the analytical results of the quality control tests, an appropriate amount of water is added to the batch with agitation for dilution.

A vitamin solution and a flavor solution are prepared separately and added to the processed blended slurry.

The vitamin solution is prepared by heating about 120 kilograms of water to a temperature from about 43° C. to about 66° C. with agitation, and thereafter adding the following ingredients, in the order listed, under agitation: Ascorbic Acid, 45% Potassium Hydroxide, Taurine, Water Soluble Vitamin Premix, Choline Chloride, and L-Carnitine. The vitamin slurry is then added to the blended slurry under agitation.

The flavor solution is prepared by adding the natural and artificial vanilla flavor and artificial caramel flavor to about 70 kilograms of water with agitation. The flavor slurry is then added to the blended slurry under agitation.

The product pH may be adjusted to achieve optimal product stability. The completed product is then placed in suitable containers and subjected to terminal sterilization.

EXAMPLE 2

Table 2 presents a bill of materials for manufacturing 4,536 kg of a chocolate flavored liquid nutritional product according to the present invention. A detailed description of its manufacture follows.

TABLE 2

Bill of Materials
For Chocolate Flavored Product

| Ingredient Name | Amount |
| --- | --- |
| Water | 3430 kg |
| Maltodextrin | 353.3 kg |
| Sucrose | 239.5 kg |
| SPH | 182.1 kg |
| Fish Oil/Medium Chain Triglyceride as a Structured Lipid | 73.2 kg |
| Partially Hydrolyzed Sodium Caseinate | 66.9 kg |
| Cocoa | 36.3 kg |
| FOS | 26.3 kg |
| Canola Oil | 22.0 kg |
| Soybean Oil | 22.0 kg |
| 45% KOH | 16.6 kg |
| Micronized TCP | 13.0 kg |
| Arginine | 11.0 kg |
| Sodium Citrate | 10.4 kg |
| N&A Vanilla Flavor | 5443.2 g |
| Panodan | 4880.7 g |
| Magnesium Phosphate | 4300 g |
| Magnesium Chloride | 3900 g |
| Potassium Citrate | 3800 g |
| Ascorbic Acid | 3160.0 g |
| Choline Chloride | 2150.0 g |
| Gellan Gum | 1134.0 g |
| DEK Premix | 920.0 g |
| Art. Chocolate Marshmallow Flavor | 907.2 g |
| Taurine | 630.0 g |
| Carnitine | 590.0 g |
| Vitamin E (RRR) (81 %) | 560.0 g |
| Trace Mineral Premix. | 457.0 g |
| WSV Premix | 400.0 g |
| 30% Beta Carotene | 70.3 g |
| Vitamin A (55%) | 23.00 g |
| Potassium Iodide | 0.88 g |
| Sodium Selenite | 0.60 g |
| Vitamin K | 0.28 g |

The trace mineral premix includes zinc sulfate (0.21 kgs.), ferrous sulfate (0.177 kgs.), manganous sulfate (0.051 kgs.), copper sulfate (0.018 kgs.). The water soluble vitamin premix includes niacin amide (0.15 kgs.), d-calcium pantothenate (0.097 kgs.), folic acid (0.003 kgs.), thiamine chloride HCl (O 025 kgs) riboflavin (0.019 kgs.), pyroxidine HCL (0.024 kgs.), cyanocobatamin (0.00007 kgs.) and biotin (0.003 kgs.) in a dextrose carrier. The vitamin DEK premix includes vitamin D3 (0.44g), vitamin E (rrr form) (253.7 g), and vitamin K (0.15 g) in a coconut oil carrier.

The liquid nutritional products of the present invention have been manufactured by preparing three slurries which are blended together, combined with the marine oil/MCT structured lipid, heat treated, standardized, packaged and sterilized. The process for manufacturing 4536 kilograms of a liquid nutritional product, using the bill of materials from Table 8 is described in detail below.

A carbohydrate/mineral slurry is prepared by first heating about 690 kilograms of water to a temperature of from about 65° C. to about 71° C. with agitation. The following minerals are then added in the order listed, under high agitation: sodium citrate, trace mineral premix, potassium citrate, magnesium chloride, magnesium phosphate, tricalcium phosphate and potassium iodide. Next, the maltodextrin is added to slurry under high agitation, and is allowed to dissolve while the temperature is maintained at about 71° C. The product has been manufactured using maltodextrin distributed by Grain Processing Corporation, Muscataine, Iowa, U.S.A. under the product name "Maltrin M-100." The sugar (sucrose) and Fructooligosaccharides are then added under high agitation. The product has been manufactured using fructooligosaccharide powder distributed by Golden Technologies Company, Golden, Colo., U.S.A. under the product designation "Nutriflora-P Fructo-oligosaccharide Powder (96%)." The gellan gum is then dry blended with sucrose in a 1/5 (gellan gum/sucrose ratio), and added to the slurry under high agitation. The product has been manufactured using gellan gum distributed by the Kelco, Division of Merck and Company Incorporated, San Diego, Calif., U.S.A. under the product name "Kelcogel." Next, cocoa is added to the blend under agitation, and sodium selenite that has been dissolved in warm water is then added to the slurry under agitation. The completed carbohydrate/mineral slurry is held with high agitation at a temperature from about 65° C. to about 71° C. for not longer than twelve hours until it is blended with the other slurries.

An oil slurry is prepared by combining and heating the soybean oil and canola oil to a temperature from about 55° C. to about 65° C. with agitation. The emulsifier (diacetyl tartaric acid esters of monodiglycerides) is then added under agitation and allowed to dissolve. The product has been manufactured using diacetyl tartaric acid esters of monodiglycerides distributed by Grindsted Products incorporated, New Century, Kans., U.S.A. under the product name PANODAN®. The Vitamin DEK premix, 55% Vitamin A Palmitate, D-alpha-a-tocopherol acetate (R,R,R form), phylloquinone and 30% beta-carotene are then added to the slurry with agitation. The completed oil slurry is held under moderate agitation at a temperature from about 55° C. to about 65° C. for a period of no longer than twelve hours until it is blended with the other slurries.

A protein in water slurry is prepared by first heating about 1930 kilograms of water to a temperature from about 60° C. to about 71° C. with agitation. The soy protein hydrolysate is then added to the water under agitation. The product has been manufactured using soy protein hydrolysate distributed by MD Foods, Viby J., Denmark under the trade designation "Soy Protein Hydrolysate." Next, 45% potassium hydroxide is added under agitation to raise the pH to from about 4.3 to about 5.5. The L-arginine is added, and partially hydrolyzed sodium caseinate is blended into the slurry using a mixing apparatus. The product has been manufactured using partially hydrolyzed sodium caseinate distributed by New Zealand Milk Products Incorporated, Santa Rosa, Calif., U.S.A. under the product name "Alanate 167." The completed protein in water slurry is held under moderate agitation at a temperature from about 60° C. to about 71° C. for a period of no longer than two hours until it is blended with the other slurries.

The protein in water and oil slurries are blended together with agitation and the resultant blended slurry is maintained at a temperature from about 55° C. to about 65° C. After waiting for at least one minute, the carbohydrate/mineral slurry is added to the blended slurry from the preceding step with agitation and the resultant blended slurry is maintained at a temperature from about 55° C. to about 65° C. The vessel which contained the carbohydrate/mineral slurry should be rinsed with about 20 kilograms of water and the rinse water should be added to the blended slurry. The marine oil/MCT structured lipid is then added to the blended slurry with agitation. Desirably, the marine oil/MCT structured lipid is slowly metered into the product as the blend passes through a conduit at a constant rate.

After waiting for a period of not less than one minute nor greater than two hours, the blend slurry is subjected to deaeration, ultra-high-temperature treatment, and homogenization, as follows:

A. use a positive pump to supply the blended slurry for this procedure;
B. heat the blended slurry to a temperature from about 65° C. to about 71 ° C.;
C. deaerate the blend to 28–38.1 cm hg
D. emulsify the blended slurry at 63–77 atmospheres;
E. pass the mix through a plate/coil heater and heat the mix to from about 120° C. to about 122° C. with a hold time of about 10 seconds;
F. ultra high temperature heat the blended slurry to a temperature of about 144° C. to about 147° C. with a hold time of about 5 seconds;
G. reduce the temperature of the blended slurry to from about 122° C. to about 122° C. by passing it through a flash cooler;
H. reduce the temperature of the blended slurry to from about 71 ° C. to about 82° C. by passing it through a plate/coil heat exchanger;
I. homogenized the blended slurry at 274–288/28–42 atmospheres;
J. pass the blended slurry through a hold tube for at least 16 seconds at temperature from about 74° C. to about 88° C.;
K. cool the blended slurry to a temperature from about 1° C. to about 7° C. by passing it through a heat exchanger; and
L. store the blended slurry at a temperature from about 1° C. to about 7° C. with agitation.

Preferably, after the above steps have been completed, appropriate analytical testing for quality control is conducted. Based on the analytical results of the quality control tests, an appropriate amount of water is added to the batch with agitation for dilution.

A vitamin solution and a flavor solution are prepared separately and added to the processed blended slurry.

The vitamin solution is prepared by heating about 80 kilograms of water to a temperature from about 43° C. to about 66° C. with agitation, and thereafter adding the following ingredients, in the order listed, under agitation: Ascorbic Acid, 45% Potassium Hydroxide, Taurine, Water Soluble Vitamin Premix, Choline Chloride, and L-Carnitine. The vitamin slurry is then added to the blended slurry under agitation.

The flavor solution is prepared by adding the natural and artificial vanilla flavor and artificial chocolate marshmallow flavor to about 25 kilograms of water with agitation. The flavor slurry is then added to the blended slurry under agitation.

The product pH may be adjusted to achieve optimal product stability. The completed product is then placed in suitable containers and subjected to terminal sterilization.

The nutritional products of the present invention are provided to the patient in any manner commonly in use in the art. It is desirable that the nutritional products be provided either in eight ounce cans, 500 ml plastic bottles, or one liter ready-to-hang bottles, etc.

The nutritional products of the present invention are particularly useful for improving the nutritional status of a patient having a malabsorption condition by enterally feeding to the patient a nutritionally effective amount of the liquid nutritional products of the present invention (an amount to prevent malnutrition of the individual patient, depending upon the individual patient's status). As used herein, the term "patient" refers to warm-blooded animals or mammals, including, but not limited to, mice, rats and humans. The identification of patients who are in need of nutritional support with the products of the present invention is well within the ability and knowledge of a skilled practitioner. A practitioner skilled in the art can readily identify, by the use of clinical tests, physical examination and medical/family history, those patients in need of nutritional supplementation with the products of the present invention.

The embodiments of the present invention may, of course, be carried out in other ways than those set forth herein without departing from the spirit and scope of the invention. The present embodiments are, therefore, to be considered in all respects as illustrative and not restrictive and that all changes and equivalents also come within the description of the present invention.

We claim:

1. An elemental liquid nutritional product comprising:
   a) a protein system which comprises;
      i) from about 40 w/w % to about 90 w/w % of soy protein hydrolysate,
      ii) from about 10 w/w % to about 60 w/w % of partially hydrolyzed caseinate in which: a) the fraction of the caseinate having a molecular weight greater than 10,000 daltons but less than 25,000 daltons, is at least 26 w/w % of the total caseinate present and is no greater than about 55 w/w % of the total caseinate present and b) the fraction of the caseinate having a molecular weight of less than 14,000 daltons, is less than about 20 w/w % of the total caseinate present, and,
      iii) optionally, from about 0 w/w % to about 10 w/w % of arginine;
   b) at least one lipid, wherein the at least one lipid comprises a structured lipid formed from marine oil and medium chain triglyceride oil, and;
   c) at least one carbohydrate.

2. The elemental liquid nutritional product according to claim 1 in which:
   a) the protein system provides from about 10% to about 25% of the total calories of the product;
   b) the at least one lipid provides from about 20% to about 35% of the total calories of the product, and;
   c) the at least one carbohydrate provides from about 50% to about 70% of the total calories of the product.

3. The liquid nutritional product of claim 2 further including at least one additional nutrient selected from the group consisting of Vitamin A, Vitamin $B_1$, Vitamin $B_2$, Vitamin $B_6$, Vitamin $B_{12}$, Vitamin C, Vitamin D, Vitamin E, Vitamin K, Biotin, Carnitine, Taurine, Folic Acid, Pantothenic Acid, Niacin, Choline, trace minerals and ultra trace minerals.

4. The elemental liquid nutritional product according to claim 1 in which:
   a) the fraction of the partially hydrolyzed caseinate having a molecular weight greater than 10,000 daltons but less than 25,000 daltons, is at least 26 w/w % of the total caseinate present and is no more than about 48% w/w % of the total caseinate present and b) the fraction of the caseinate having a molecular weight of less than 14,000 daltons is less than about 15 w/w % of the total caseinate present.

5. The elemental liquid nutritional product according to claim 1 in which the at least one carbohydrate includes a sufficient quantity of a palatability enhancer selected from the group consisting of sucrose, fructose, glucose and high fructose corn syrup and said product has a caloric density between 0.60 kcal/ml and 1.10 kcal/ml.

6. The elemental liquid nutritional product according to claim 5 in which the palatability enhancer is sucrose and is present in a sufficient amount to provide at least 19% of the total calories of the product.

7. The liquid nutritional product of claim 5 wherein the at least one carbohydrate comprises from about 35–45 w/w % sucrose based upon total carbohydrate content.

8. The elemental liquid nutritional product according to claim 1 in which said at least one lipid further comprises a blend of oils sufficient to provide all essential fatty acids.

9. The elemental liquid nutritional product according to claim 1 in which at least about 50 w/w % of the soy protein hydrolysate has a molecular weight of less than 1,000 daltons.

10. The elemental liquid nutritional product according to claim 9 in which at least about 80–90 w/w % of said soy protein hydrolysate has a molecular weight of less than 5,000 daltons.

11. The elemental liquid nutritional product according to claim 9 in which: a) the fraction of the caseinate having a molecular weight greater than 10,000 daltons but less than 25,000 daltons, is at least 26 w/w % of the total caseinate present and is no greater than about 39 w/w % of the total caseinate present, and b) the fraction of the caseinate having a molecular weight of less than 14,000 daltons is less than about 10 w/w % of the total caseinate present.

12. The elemental liquid nutritional product according to claim 1 in which said at least one lipid is a blend, which includes based upon total lipid content, from about 30 w/w % to about 75 w/w % of a structured lipid formed from marine oil and medium chain triglyceride oil, and from about 25 w/w % to about 70 w/w % of non-structured lipids selected to provide a source of essential fatty acids and energy.

13. The liquid nutritional product of claim 1 wherein the at least one carbohydrate comprises from about 0 w/w % to about 10 w/w % of a fructooligosaccharide.

14. The elemental liquid nutritional product according to claim 1 in which:
   a) the protein system provides from about 18 to about 25% of the total calories of the product,
   b) the at least one lipid provides from about 20% to about 30% of the total calories of the product, and;
   c) the at least one carbohydrate provides from about 50% to about 60% of the total calories of the product.

15. A method for providing nutrition to a patient comprising enterally administering a liquid nutritional product according to claim 1.

16. A method for providing nutrition to a patient having a malabsorption condition comprising enterally feeding said patient with a liquid nutritional product according to claim 1.

17. An elemental liquid nutritional product which comprises:
   a) a protein system providing from about 18 to about 25% of the total calories of the product, in which said protein system comprises;
      i) from about 40 w/w % to about 90 w/w % soy protein hydrolysate,
      ii) from about 10 w/w % to about 60 w/w % of partially hydrolyzed caseinate in which; a) the fraction of the caseinate having a molecular weight greater than 10,000 daltons and less than 25,000 daltons is at least about 26 w/w % of the total caseinate present and is no more than about 39 w/w % of the total caseinate present, and b) the fraction of the caseinate present having a molecular weight of less than 14,000 daltons is less than about 10 w/w %, of the total caseinate present.
      iii) optionally, from about 0 w/w % to about 10 w/w % of arginine;
   b) a lipid system which provides from about 20% to about 30% of the total calories of the product, in which the lipid system comprises a structured lipid formed from marine oil and medium chain triglyceride oil, and a blend of oils sufficient to provide sufficient amounts of all of the essential fatty acids;

c) a carbohydrate system which provides from about 50% to about 60% of the total calories of the product, in which the carbohydrate system includes a sufficient quantity of sucrose to provide at least about 19% of the total calories of the product, and;

d) said product has a caloric density between about 0.95 kcal/ml and about 1.05 kcal/ml.

18. An elemental nutritional product according to claim 17 in which the carbohydrate system comprises from about 0 w/w % to about 10 w/w % of a fructooligosaccharide.

19. The elemental liquid nutritional product according to claim 17 in which at least 50 w/w % of said soy protein hydrolysate has a molecular weight of less than 1000 daltons.

20. The elemental liquid nutritional product according to claim 17 in which at least about 80 w/w % of said soy protein hydrolysate has a molecular weight of less than 5000 daltons.

21. A method for providing nutrition to an ambulatory patient having a malabsorption condition comprising enterally feeding said patient with a liquid nutritional product according to claim 17.

* * * * *